United States Patent [19]

Daoust et al.

[11] 4,047,604

[45] Sept. 13, 1977

[54] APPARATUS FOR CONTROLLING THE FLOW OF CONCRETE FROM A MIXER

[75] Inventors: Ralph R. Daoust; Timothy N. Daoust, both of Anderson, Ind.

[73] Assignee: Front Discharge Mixer, Inc., Anderson, Ind.

[21] Appl. No.: 670,552

[22] Filed: Mar. 25, 1976

[51] Int. Cl.[2] .......... B65G 11/12

[52] U.S. Cl. .......... 193/10; 193/16

[58] Field of Search .......... 193/4, 5, 6, 10, 25 C, 193/16, 17; 198/535, 536; 259/172; 214/17 CB

[56] References Cited

U.S. PATENT DOCUMENTS

| | | | |
|---|---|---|---|
| 2,968,915 | 1/1961 | Feistel | 259/172 X |
| 3,019,002 | 1/1962 | Prichard | 259/172 X |
| 3,285,476 | 11/1966 | Pellow et al. | 193/10 X |
| 3,367,636 | 2/1968 | Duecy | 193/16 X |
| 3,456,769 | 7/1969 | Prichard et al. | 193/4 |
| 3,485,536 | 12/1969 | Donelson | 214/17 CB X |
| 3,542,179 | 11/1970 | Prichard | 193/10 X |
| 3,633,719 | 1/1972 | Lynch | 193/10 |

*Primary Examiner*—John J. Love
*Assistant Examiner*—James L. Rowland
*Attorney, Agent, or Firm*—Allegretti, Newith, Witcoff & McAndrews

[57] ABSTRACT

A mechanism for controlling the direction of flow of concrete from the discharge opening of a concrete mixing drum, preferably mounted on a vehicle having a chassis with a cab at the front end wherein the discharge opening of the mixing drum is adjacent the cab. The apparatus includes a rigid support frame with a collecting hopper rigidly mounted on the frame adjacent the discharge opening of the mixing drum for receiving concrete flowing through the discharge opening of the mixing drum. An outlet is provided in the hopper for the discharge of concrete therethrough. A bearing is mounted around the outlet. A driven gear is rotatably carried by the bearing for movement in a substantially horizontal plane about a substantially upright axis. An elongated discharge chute is pivotally carried by the driven gear for movement with the driven gear for movement about a horizontal axis and is positioned for receiving concrete flowing through the outlet of the hopper. A hydraulic drive motor is rigidly mounted on the support and a drive gear is operatively driven by the hydraulic motor. The drive gear operatively and drivably engages the driven gear for rotating the driven gear and thereby the chute, in response to the drive motor, about a substantially upright axis, for controlling the direction of flow of concrete from the discharge opening of the mixing drum as the concrete flows down the chute.

10 Claims, 9 Drawing Figures

Fig. 1
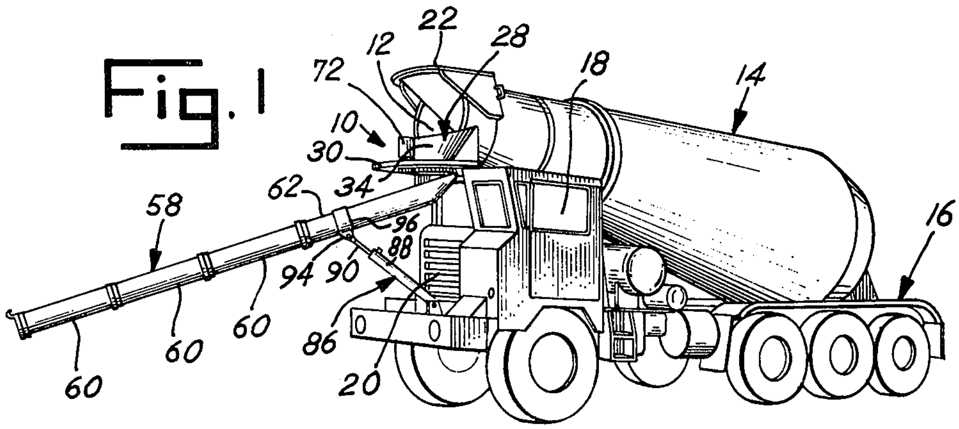
Fig. 2
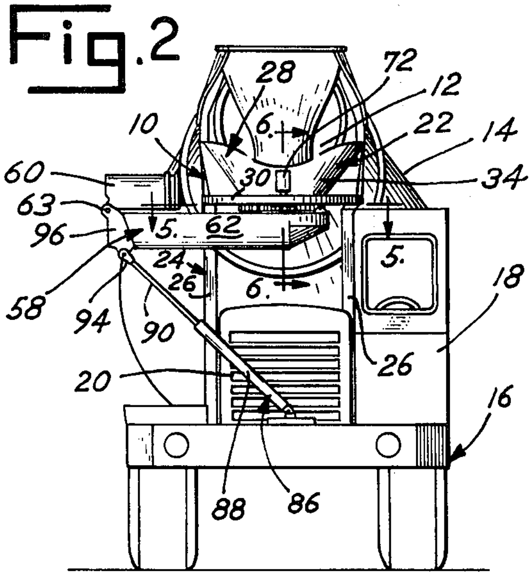
Fig. 3
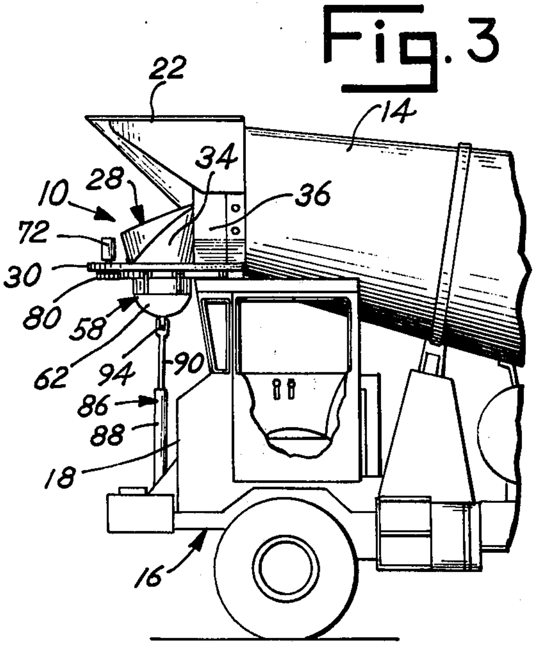
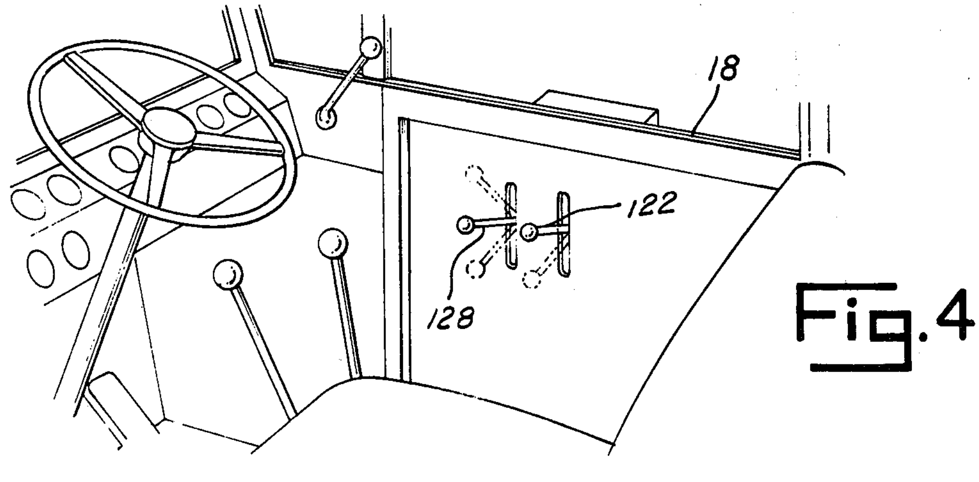
Fig. 4

Fig. 5
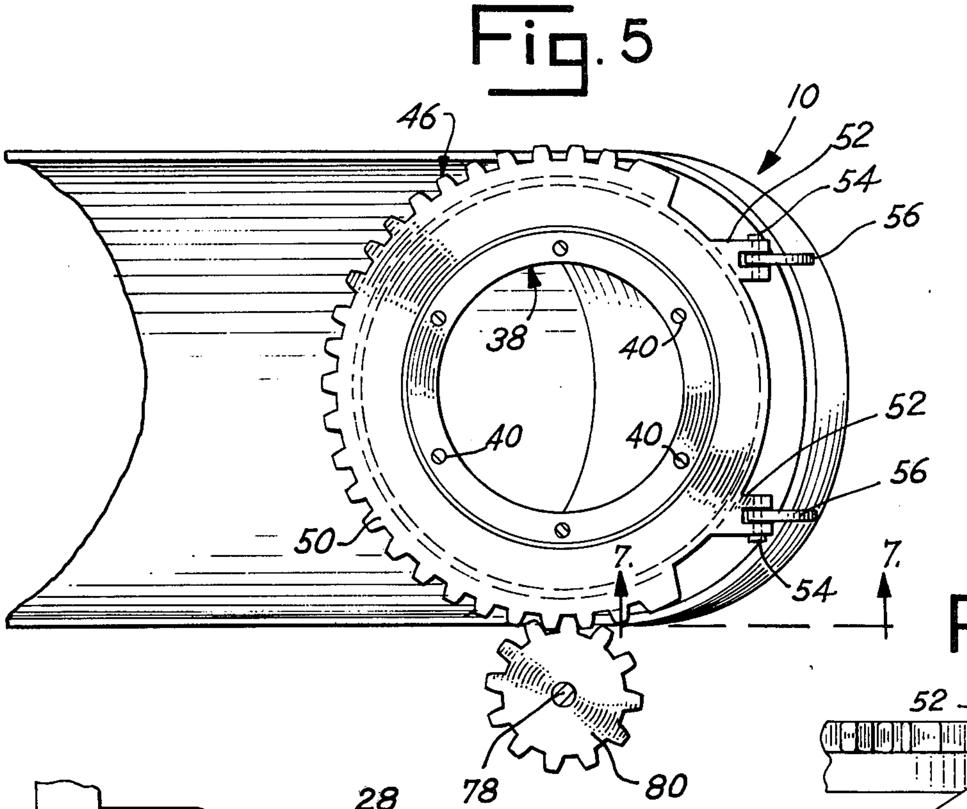
Fig. 7
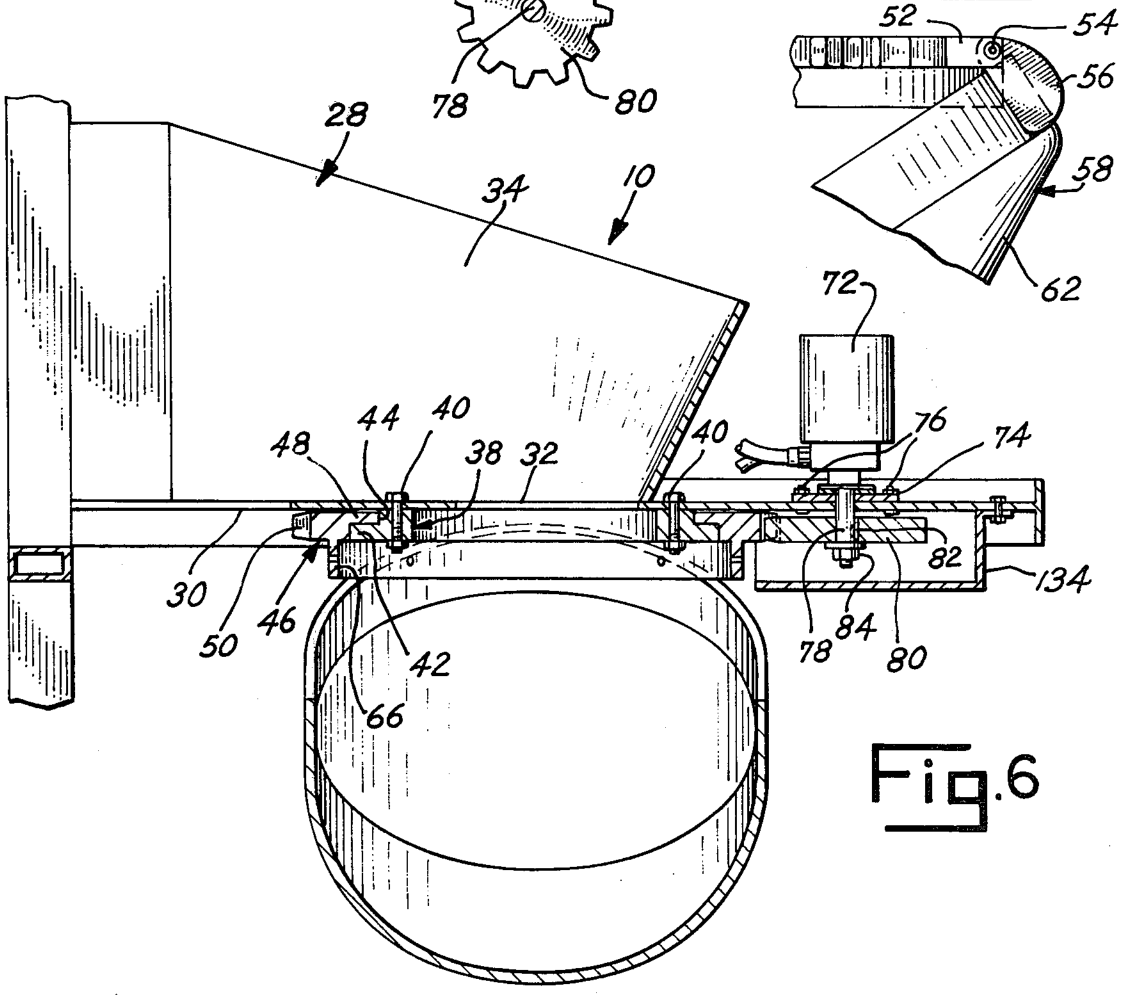
Fig. 6

APPARATUS FOR CONTROLLING THE FLOW OF CONCRETE FROM A MIXER

BACKGROUND OF THE INVENTION

Field of the Invention and Description of the Prior Art

This invention relates to an improved mechanism for controlling the direction of flow of concrete from the outlet of a concrete mixing drum, and it particularly relates to a mechanism for controlling the direction of flow of concrete from a front discharging type of concrete mixer mounted on a truck chassis.

It is very common today to mount a concrete mixing drum on the chassis of a truck in order that concrete can be mixed enroute from the place of loading or charging of the mixer to the place were the concrete is to be poured. The advantages of mounting the concrete mixing drum on a truck chassis are well known and are primarily significant savings in the production of concrete and in speeding up construction time as the vehicles can be brought close to the place where the concrete is to be poured.

The most common practice for years was to mount the concrete mixer in such a way as the discharge was directed rearwardly of the vehicle. In this case, one person would manually position the discharge end of a discharge to the position where the concrete was to be poured while the truck driver manipulated the vehicle to the desired position. Thus, with rear discharge mixers, the pouring of concrete from the mixer was a two man job. In order to economize on labor, in more recent years, it has become the practice to mount the discharge opening and chute at the forward end of the vehicle so that the driver alone can generally view and control the direction of flow of concrete when seated within the cab of the truck.

One such patent which shows a front end discharging arrangement is Hansen et al. U.S. Pat. No. 3,334,872. In this patent, the discharge chute is rotatably moved about a substantially upright axis by the use of a rather complex arrangement of a double-acting, double-ended power cylinder operating in combination with cables and pulleys for imparting the desired rotational movement to the discharge chute. The actual movement is accomplished by a frictional engagement of the carriage assembly for the chute with the cable, which is moved by the cylinder. This arrangement is not only a relatively complex construction, the friction drive is not always completely reliable. For example, when a truck is not parked on level ground, and the chute must be pivoted or swung in an uphill direction, the friction drive mechanism sometimes does not have adequate drive power to pivot the chute assembly. Also, concrete, particularly that which hardens on the operating parts, as the piston rod, can adversely affect the operation of the mechanism.

In another known system, a chain drive is used in combination with a hydraulic motor to engage a sprocket in an assembly which rotatably moves the chute assembly about an upright axis. The chain drive is considered unsatisfactory because, during use, the chain often stretches, becomes disengaged from the sprockets and actually may fall from the equipment. Another disadvantage is that as concrete hardens and builds up on the chain, it ultimately breaks.

In another known mechanism for rotating a discharge chute of a front discharge mixer, a hydraulic cylinder operates a crank which, in turn, operates a gear segment which engages a drive gear segment for rotating the chute assembly. Such an arrangement, however, is considered unsatisfactory because, as mentioned above, concrete builds up on the cylinder rod and adversely affects operation.

Thus, although various mechanisms have been used for rotating the discharge chute for a concrete mixer about an upright axis, particularly of the type used in a front discharge type of a concrete mixer truck, it is apparent that there is a significant need for a more reliable mechanism for controlling the flow of concrete wherein the mechanism is simpler in construction and more reliable in use.

SUMMARY OF THE INVENTION

It is therefore an important object of this invention to provide an improved mechanism for controlling the direction of flow of concrete being discharged from the outlet of a concrete mixing drum wherein the mechanism is highly reliable in operation and simple in construction by using a direct rotary drive connection between the carriage assembly for the discharge chute and the drive gear of a hydraulic drive motor.

It is also an important object of this invention to provide an improved mechanism for controlling the horizontal rotational movement of a discharge chute of a concrete mixer wherein the drive mechanism comprises a hydraulic drive motor having a gear which drivably intermeshes with a rotatable gear assemblly which pivotally carries the chute assembly for movement through a variety of upright axes.

It is yet another important object of the invention to provide an improved mechanism for controlling the direction of flow of concrete from the outlet of a concrete mixing drum wherein the mechanism is characterized by its simplicity and economy of construction, manufacture, and maintenance and its reliability and convenience in use.

Further purposes and objects of the invention will appear as the specification proceeds.

The foregoing objects are accomplished by providing a mechanism for controlling the direction of flow of concrete being discharged from the discharge opening of a concrete mixing drum, particularly of the type which discharges concrete from the front of a concrete mixer truck, the improved mechanism preferably including a concrete mixer truck, the improved mechanism also including a support frame, a hopper being rigidly mounted on the support frame adjacent the discharge opening of the mixing drum for receiving concrete therefrom, an outlet on the hopper for discharging the concrete therethrough, a rigid bearing mounted adjacent the outlet, a driven gear rotatably carried by the bearing for movement in a substantially horizontal plane and about a substantially upright axis relative to the support frame and the truck, an elongated discharge chute is pivotally carried by the driven gear for movement therewith in said horizontal plane and for movement relative thereto in a substantially upright plane relative to the support frame, a discharge chute having an upper end which is positioned for receiving concrete flowing through the hopper outlet downwardly to the lower end thereon by gravity flow, a hydraulic drive motor rigidly mounted on the support frame, a drive gear operatively driven by the hydraulic motor, said drive gear operatively and drivably engaging the driven gear for rotating the driven gear and thereby the chute about a substantially upright axis whereby the operator may conveniently position the discharge end of the chute at a desired location.

BRIEF DESCRIPTION OF THE PREFERRED EMBODIMENT

One particular embodiment of the present invention is illustrated in the accompanying drawings wherein:

FIG. 1 is a pictorial view of a truck having a concrete mixing drum thereon wherein the concrete is discharged from the front thereof and wherein the apparatus utilizes our improved mechanism for controlling the direction of flow of concrete passing from the mixing drum;

FIG. 2 is a front elevational view of the concrete mixer of FIG. 1;

FIG. 3 is a fragmentary side elevational view of the front of the truck shown in FIGS. 1 and 2;

FIG. 4 is a pictorial view of the interior of the cab of the truck, showing the manual control levers for operating the improved mechanism for controlling the direction of flow of concrete passing from the mixing drum;

FIG. 5 is an enlarged sectional, detailed plane view taken along the line 5—5 of FIG. 2 illustrating a portion of our improved concrete flow controlling mechanism;

FIG. 6 is an upright, sectional, detailed view taken along the line 6—6 of FIG. 2 illustrating another portion of the improved concrete flow controlling mechanism;

FIG. 7 is a fragmentary view taken along the line 7—7 of FIG. 5 illustrating the interconnection between the chute and the driven gear for movement of the chute relative to the driven gear;

DETAILED DESCRIPTION OF THE PREFERRED EMBODIMENT

Figure 8:
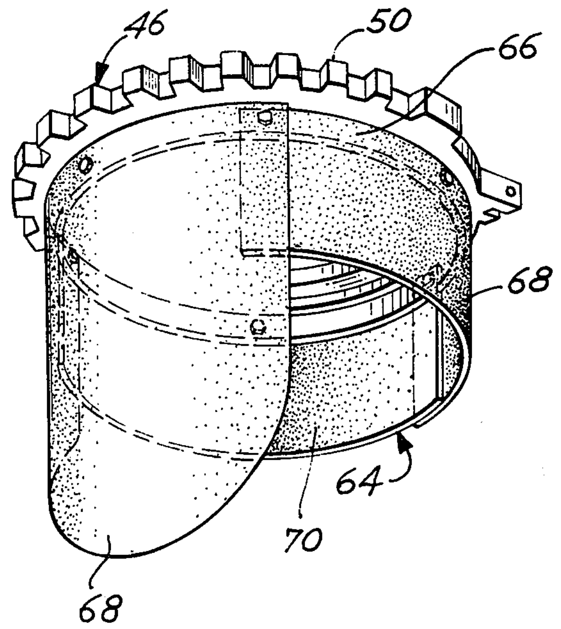
FIG. 8 is a pictorial view of a flexible sleeve mounted on the driven gear for guidably directing the flow of concrete to the chute.

Referring to the drawings, particularly FIGS. 1-3, our concrete flow controlling mechanism, generally 10, is shown mounted adjacent the outlet of a discharge opening 12 of a concrete mixing drum assembly, generally 14. Preferably, the mixing drum 14 is rotatably mounted on a truck, generally 16, on the chassis thereof, with the rotational axis of the drum 14 being tilted upwardly from the rear end of the truck 16 to the front end thereof. The upwardly and forwardly tilted axis for the mixing drum 14 is generally positioned in the same plane as the center line of the truck 16. The direction control mechanism 10, adjacent the discharge opening 12 of the mixing drum 14, is positioned at the forward end of the truck in an elevated position relative to the rear portion of the axis of the mixing drum 14. The truck 16 includes a forward operator cab, generally 18, mounted laterally of the control mechanism 10. An engine 20 is also mounted laterally adjacent the cab 18 and is positioned generally below the control mechanism 10 and the discharge opening 12 of the mixing drum 14. Although it is to be understood that the control mechanism 10 may be utilized with other types of concrete mixers, it is preferred, for the full utilization of the advantages of the control mechanism 10, that the mechanism 10 be used in connection or combination with a front discharging type of concrete mixer mounted on a truck, as shown in FIGS. 1-3.

The mixing drum assembly 14 is of generally conventional construction as is the truck 16, the cab 18, and the engine 20. Suitable drive means (not shown) rotatably drive the mixing drum 14 about its rotational axis, as when the truck 16 is in transit from the location where the charging of the mixing drum takes place and to the place where the mixed concrete is to be poured. As is conventional, the mixing drum 14, at its forward elevated end, includes a charging hopper 22 for receiving the conventional mixture of water, sand, cement and aggregate. The charging hopper 22 is positioned directly above the discharge opening 12 of the drum and above the directonal flow control mechanism 10. The invention involved herein is specifically directed to the mechanism 10 and to the specific manner in which the mechanism 10 is operated to direct the flowing concrete from the drum discharge opening.

Referring to FIGS. 2, 5 and 6, a support frame assembly, generally 24, is provided for rigidly mounting the mechanism 10 to the truck 16. The frame 24 includes a pair of laterally spaced rigid upright supports 26 which are secured to the chassis of the truck 16. A concrete collecting hopper, generally 28, is rigidly secured to the upper ends of the spaced upright support members 26. The hopper assembly 28 includes a generally horizontal rigid plate 30 which is rigidly secured, as by welding, to the upright supports 26. As seen in FIG. 2, the plate 30 is also preferably rigidly secured to a portion of the roof of the cab 18. A discharge opening or outlet 32 is provided in the plate 30. The discharge opening or outlet 32 is surrounded on the front and sides by a generally frusto-conical funnel member 34.

As seen best in FIG. 3, the funnel 34 is positioned adjacent an upright rigid frame 36 which surrounds the discharge opening 12 of mixing drum 14. The discharge opening 12 is positioned so that the concrete flows through the discharge opening 12 directly into the collecting hopper 28, with minimal splashing or loss of concrete during use.

As seen in FIG. 6, a rigid ring-like bearing member 38, at least as large as the size of the outlet 32 in the horizontal plate 30, is rigidly secured to the underside of the plate by bolts 40. The fixed bearing member or inner race 38 includes an annular lower outer flange 42 which defines an annular inset 44 between the flange 42 and the lower surface of the horizontal plate 30.

A unitary ring-like bearing-gear member, generally 46, is rotatably received within the inset 44. The bearing-gear member 46 includes an upper inwardly projecting flange 48 which is received within the inset 44 of the bearing for rotational movement therein. The ring-like gear-bearing member 46 includes a unitary outer gear segment 50. The gear segment 50 extends for approximately 200° around the outer periphery of the member 46. On the portion of the gear-bearing member 46 intermediate the opposite ends of the gear segment 50, there is provided a pair of rigid, unitary ears 52, as best seen in FIGS. 5 and 7. Each of the ears 52 receives a bearing pin 54 which, in turn, pivotally receives one of two rigid arm 56 which are rigidly and unitarily positioned on the upper end of an extendable elongated chute, generally 58. The bearing member 38 and bearing-gear member 46 cooperate to define a carriage for manually carrying the chute 58 for movement relative to the discharge opening 12 and the support frame 24 so the flowing concrete can be directed to the proper location.

The chute 58, as seen in FIGS. 1 and 2, comprises an open, extendible and retractable trough or chute which is movable between the position of FIG. 1 when concrete is flowing from the discharge opening 12 of the mixing drum 14 and, as seen in FIG. 2, the retracted position, when the truck 16 is in transit or not in use. The chute 58 has a C-shaped cross-section with an open top and includes three telescoping outer sections 60 which telescope relative to each other. The telescoping sections are pivotally mounted with respect to an upper section 62. The lower or outer end of the chute 58 is pivotally secured to the inner end of the innermost telescoping section 60, at 63, as seen in FIG. 2.

The upper end of the upper chute section 62 has the arms 56 rigidly mounted thereon in order to pivotally carry the chute assembly 58 on the bearing-gear assembly 46, which acts as a carriage, to enable pivoting movement of the chute 58 about a normally horizontal axis and through any of a variety of upright planes. The chute 58 is thereby movable in both normally vertical or upright and normally horizontal planes.

As seen best in FIG. 8, a flexible sleeve or boot, generally 64, is rigidly secured to a downwardly extending lower flange 66, which is unitary of the fixed gear-bearing member 46. Desirably, the sleeve 64 is constructed with multiple sections including a central section 68 which extends downwardly towards the chute 58 in order to reduce splashing of the concrete passing therethrough, at the front thereof. Two side sections 70, of the same constructional material, are also secured to the flange 66. The flexible sleeve 64 acts to guide the concrete flowing through the outlet 32 of the plate 30 from the collecting hopper 28 to the upper end of the upper section 62 of the chute 58 with minimal splashing and loss of concrete.

Figure 9:
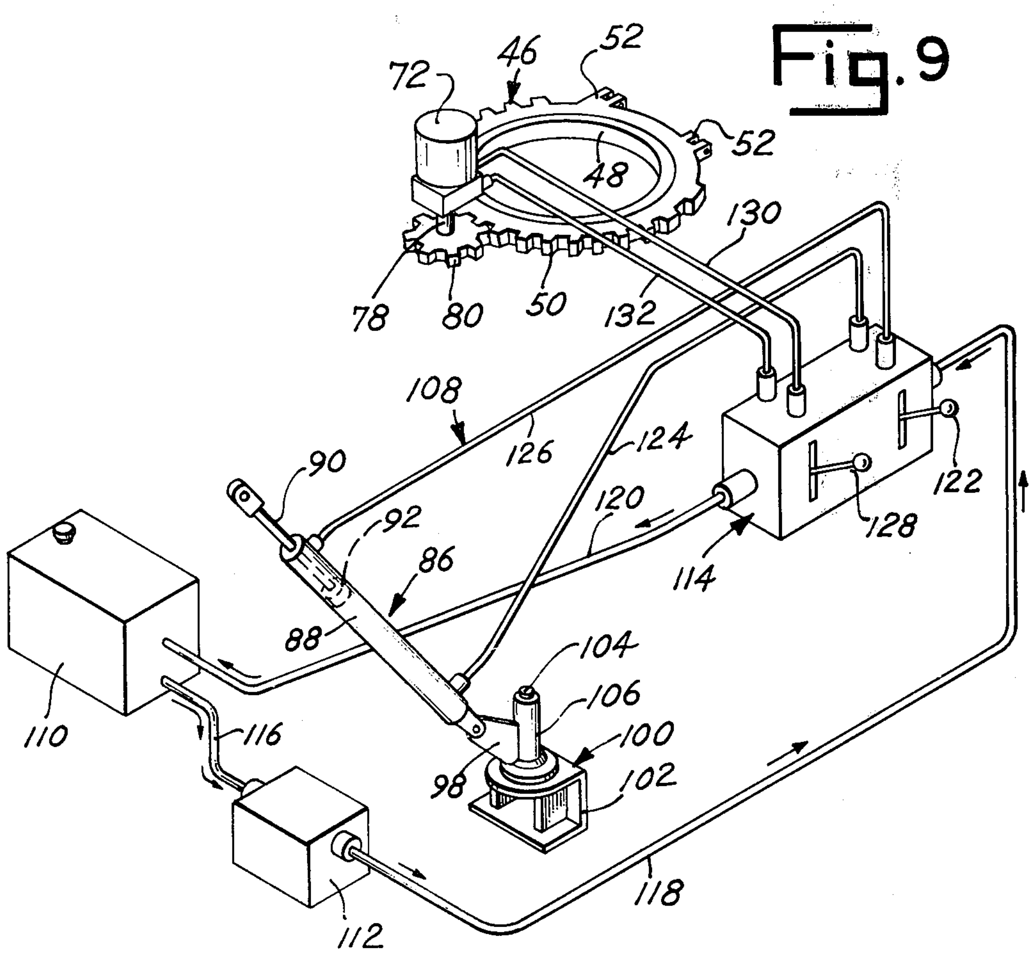
FIG. 9 is a pictorial view of the hydraulic system for operating the hydraulic drive motor for pivoting the chute about an upright axis and of the lift cylinder for moving the chute through a substantially upright plane.

As indicated above, in order to direct or control the direction of flow of concrete passing from the discharge opening 12 of the mixing drum 14 to the pouring location, it is necessary to move the chute 58 both about a normally horizontal axis and about a normally vertical axis, or in normally vertical and horizontal planes. For rotating the chute 58 about the vertical or upright axis relative to the truck 16, a hydraulic drive motor 72 is rigidly secured to the upper forward portion of the horizontal support plate 30. The hydraulic motor 72 is mounted in an upright direction, as best seen in FIG. 6, and includes a mounting flange 74 which is fixedly secured by bolts 76 to the plate 30 in order to fixedly secure the hydraulic motor 72 to the plate 30. The hydraulic motor 72 includes a generally upright drive shaft 78. A drive gear is fixedly, but removably, secured to the drive shaft 78 beneath the horizontal plate 30. The drive gear 80, as seen in FIGS. 5 and 9, drivably intermeshes with the gear segment 50 of the gear-bearing member 46. Rotation of the drive gear 80 rotates the gear-bearing member 46 and also the chute 58 for horizontal rotation about a vertical or upright axis. Any suitably means may be used to removably secure the drive gear 80 to the drive shaft 78, as by a key assembly 82 with a nut 84 secured to the lower outer end of the drive shaft 78. Alternatively, a taper lock (not shown) may be utilized for removably securing the drive gear 80 to the drive shaft 78.

In order to move the chute 58 about the horizontal axis defined by the axially aligned pivot pins 54 which pivotally carry the chute 58, a double acting hydraulic lift cylinder, generally 86, is provided. The lift cylinder 86 includes a cylinder portion 88 and a reciprocal drive rod 90 having piston 92, as seen in FIG. 9, slidably and sealably movable within the cylinder portion 88. The upper, outer end of the drive rod 90 is interconnected by a universal joint connection 94, to the chute 58. As seen in FIGS. 1 and 2, a slidable support 96 is carried on the upper section 62 of the chute 58 and secured to the universal joint 94. The lower end of the lift cylinder 86 is pivotally carried by an arm 98 of a fixed swivel support assembly 100, as seen in FIGS. 1, 2 and 9. The swivel 100 includes a base 102 which is fixed to the forward end of the truck 16. The base 102 has an upright pivot rod 104 secured thereto. A rotatable member 106 rigidly carries the arm 98 and is rotatably carried by the pivot rod 104.

Referring to FIG. 9, there is schematically shown a hydraulic system, generally 108, for operating the hydraulic drive motor 72 and the hydraulic lift cylinder 86. The hydraulic control system includes a hydraulic fluid reservoir 110 and a hydraulic pump 112, which may also function as the power steering pump for the vehicle or truck 16, for providing pressurized hydraulic fluid. The hydraulic control system 108 includes a hydraulic control valve assembly, generally 114. An inlet line 116 interconnects the reservoir 110 to the pump 112. A hydraulic inlet line 118 interconnects the pump 112 with the control valve 114. An oulet line 120 interconnects the control valve 114 with the reservoir 110. The control valve 114 includes a lift cylinder control portion and a hydraulic drive motor control portion. The lift cylinder portion includes a three position manual control lever 122 which acts to selectively raise or lower the chute 58 by applying fluid pressure either on the underside or on the underside of the piston 92 of the lift cylinder 86. A stop position is also provided for the lever 122. By shifting the lever 122, the operator changes the direction of flow of the pressurized hydraulic fluid between a line 124 which passes from the valve 114 to the lower end of the lift cylinder 86 and a line 126 passing between the upper end of the lift cylinder 86 and the valve 114. A three position manual control lever 128 is used to direct pressurized fluid on opposite sides of the drive motor 72 for selectively drivably rotating the drive gear 80 both in clockwise and in counterclockwise directions. The control valve lever 128 has a neutral position wherein both lines 130 and 132 are relieved of pressure so as to permit manual rotation of the chute 58, about a vertical axis.

Although it is believed that the operation of the mechanism 10 is clear from the foregoing description, a brief description of the operation will be provided so as to more fully understand the advantages of the invention. After concrete mixture has been charged into the charging hopper 22 of the mixing drum 14 and the truck 16, carrying the mixing drum 14, has moved from the charging site to the place of use, after the concrete has been mixed, the operator moves the chute 58 from the inoperative position of FIG. 2 to the operative position of FIG. 1. First, the operator can manually pivot the telescoping sections 60 about the pivot connection 63. The operator can then return to the cab and operate the hydraulic motor 72 and lift cylinder 86 from within the cab, as seen in FIG. 4, to move the chute 58 both about normally vertical and horizontal axes. When the operator is sitting within the cab, as viewed in FIG. 4, and desires to move the chute about a horizontal axis for proper positioning, it is only necessary to move the lever 122 from the full line position of FIG. 4 to the dotted line position, at which position, pressurized fluid passes from the control valve 114 through the line 126 to the upper side of the piston 92 to thereby drive the piston rod 90 downwardly and thereby pivot the chute 58 downwardly about the axis defined by the pivot pins 54 at the upper end of the upper section 62 of the chute 58 as mounted on the gear-bearing member 46. When the chute 58 has been lowered to the desired lowered position, the operator can shift the lever 122 to the stop position.

The operator can then rotate the chute 58 about the vertical or upright axis, by moving the lever 122 from the neutral position to the right or left rotation position, depending upon the selected direction of rotation of the chute 58. By moving the lever 128 to the right or left position, the operator can selectively control the flow of pressurized fluid through the lines 130 and 132 so that the gear 80 rotates either in a clockwise or counterclockwise direction. Because of the intermeshing engagement between the drive gear 80 and the driven gear segment 50 of the gear-bearing assembly 46, the assembly or carriage 46 rotates together with the chute 58 until the lower end of the chute 58 has reached the desired position for pouring.

Although the above description of operation indicates that the lift cylinder 86 is operated first and then the hydraulic motor 72 is operated, the operations can be reversed, in accordance with the operator's desires as the particular order of operation is not considered to be significant.

The mechanism 10 fulfills all of the objects previously set forth. The mechanism is simple and economical in construction and is reliable in operation. The gear portion 50 and the drive gear 80 are both positioned below the horizontal plate 30 which acts to shield the gears 50 and 80 from concrete being collected and hardening thereon. Even if concrete does collect and harden on the gears, the hydraulic drive motor, preferably of a relatively high horse power, as 40 horsepower, has sufficient strength to break off any hardened concrete. Also, the gears are sturdily constructed so as to be uneffected by small amounts of concrete build-up and by breaking of the concrete as the drive motor rotates the gear. Preferably, a cover 134 is secured to the underside of the plate 30 in order to shield the drive gear 80 and the driven gear segment 50 from most concrete build-up.

While in the foregoing there has been provided a detailed description of one particular embodiment of the present invention, it is to be understood that all equivalents obvious those having skill in the art are to be included within the scope of the invention as claimed.

What we claim and desire to secure by Letters Patent is:

1. A mechanism for controlling the direction of flow of concrete from the discharge opening of a concrete mixing drum, said mechanism comprising, in combination, a support frame, a concrete collecting hopper rigidly mounted on said frame adjacent said opening of said mixing drum for receiving concrete therefrom, outlet means on said hopper for the discharge of concrete therethrough from said hopper, rigid annular bearing means mounted adjacent said outlet means and on said support frame, driven gear means having an annular bearing portion for rotatably carrying said driven gear means on said annular bearing means for rotation about a substantially upright axis, hinge means defined on said driven gear means, an elongated pivotally carried by said hinge means for rotational movement with said driven gear means about said upright axis and for movement in a substantially upright plane, said chute having an upper end positioned for receiving concrete flowing through said outlet means, a hydraulic drive motor rigidly mounted on said support frame, and a drive gear operatively driven by said hydraulic drive motor, said drive gear operatively and drivably engaging said driven gear means for rotating said driven gear means and thereby said chute about said substantially upright axis.

2. The apparatus of claim 1 including hydraulic control means, which including a hydraulic control valve for selectively operating said hydraulic motor for movement in opposite directions and including a neutral position for permitting manual rotational movement of said driven gear means and said chute about said substantially upright axis.

3. The apparatus of claim 1 including a hydraulic lift cylinder pivotally secured to said discharge chute for movement of said chute through said substantially upright plane and about the pivotal connection between said gear means and said chute.

4. The apparatus of claim 3 including hydraulic valve means for selectively operating said lift cylinder for raising or lowering said chute.

5. The apparatus of claim 1 including flexible sleeve means mounted on said driven gear means for directing the flow of concrete from said outlet means to said chute with minimal loss of concrete during flow.

6. The apparatus of claim 1 wherein said mixing drum is mounted on a truck and cab means for an operator at the front end of said truck, said chute means being positioned adjacent said cab in a position for viewing by said operator.

7. The apparatus of claim 6 including hydraulic control means, which includes a hydraulic control valve for selectively operating said hydraulic motor for movement in opposite directions and including neutral position for permitting manual rotational movement of said driven gear means and said chute about said substantially upright axis.

8. The apparatus of claim 6 including hydraulic lift cylinder pivotally secured to said discharge chute for movement of said chute through said substantially upright plane and about the pivotal connection between said gear means and said chute.

9. The apparatus of claim 8 including hydraulic valve means for selectively operating said lift cylinder for raising or lowering said chute.

10. The apparatus of claim 1 wherein said driven gear means has an open central portion in communication with said outlet means through which said concrete flows, said bearing means and said bearing portion being spaced laterally of said open central portion and away from the flow of said concrete.

* * * * *